Dec. 23, 1952 A. VALENTE 2,622,356
ILLUMINATED AUTOMOBILE LICENSE PLATE HOLDER
Filed Aug. 14, 1950
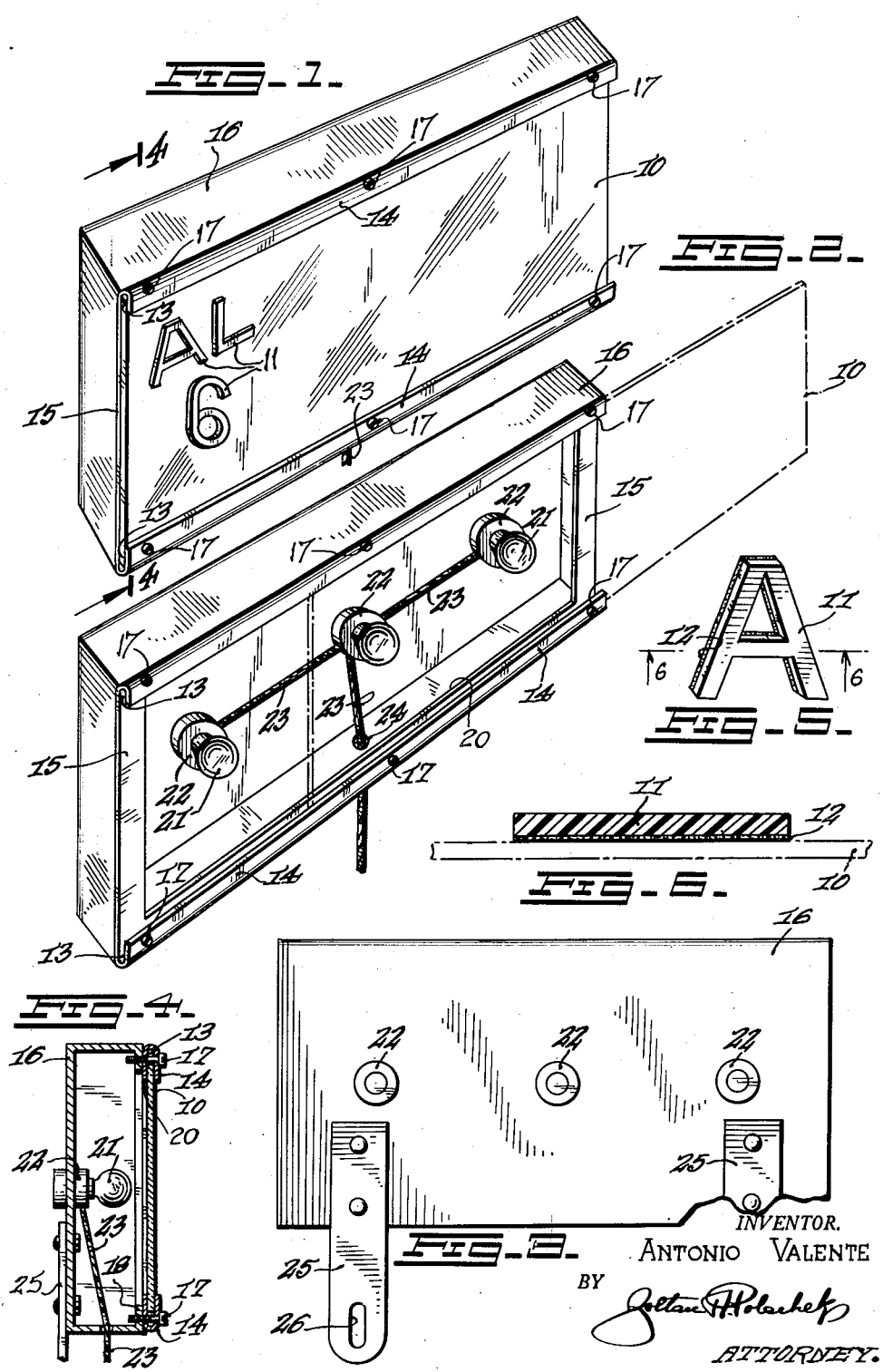
INVENTOR.
ANTONIO VALENTE
BY
ATTORNEY.

Patented Dec. 23, 1952

2,622,356

UNITED STATES PATENT OFFICE 2,622,356

ILLUMINATED AUTOMOBILE LICENSE PLATE HOLDER

Antonio Valente, Albany, N. Y.

Application August 14, 1950, Serial No. 179,273

2 Claims. (Cl. 40—132)

1

This invention relates to new and useful improvements in automobile license plates and holders therefor.

It is the custom in many States to provide but one license plate for each automobile, such plate being mounted on the rear of the vehicle. However, modern automobiles are provided with both front and rear license plate brackets, and for this and other reasons, automobile owners purchase or construct an unofficial plate for the front of the automobile.

It is one object of the invention to provide an improved illuminated license plate for use in situations such as described above and also as the official license plate where such is permissable.

Another object of the invention is to construct the improved license plate and the mounting means therefor so that the same is readily removable and the illuminating means is easily accessable for replacement and repairs and so on.

Still another object of the invention is to construct the license plate so that the several letters and numerals thereon are individually removable and replaceable, the plate thus being usable with a succession of differently lettered and numbered official license plates.

For further comprehesion of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the license plate of the invention and the housing therefor.

Fig. 2 is a perspective view of the housing, per se.

Fig. 3 is a rear view of the said housing.

Fig. 4 is a sectional view on line 4—4 of Fig. 1.

Fig. 5 is a perspective view of one of the letters of said license plate.

Fig. 6 is an enlarged sectional view on line 6—6 of Fig. 5.

Referring more particularly to the drawings wherein a preferred form of the invention is illustrated, the reference numeral 10 indicates a license plate formed of translucent plastic material. On the face of said plate are secured a plurality of letters and numerals 11 each individually formed of opaque plastic material, see Figs. 1, 4, 5 and 6. The one face of each letter or numeral 11 is provided with an adhesive coating 12 by which the same is secured on the plate

2

10. Preferably the plate 10 and the letters and numerals 11 are of contrasting colors in order to make the latter distinctly readable during the daylight hours.

The construction thus far described is such that a source of illumination be placed behind the plate 10, the letters 11 are distinctly outlined for reading the same at night. Further, the letters 11 are individually securable on plate 10 and can readily be removed therefrom and replaced by others. This latter feature adapts the plate 10 for use with a succession of differently lettered and numbered official license plates.

The plate 10 is mounted in grooves 13 formed by the outwardly and inwardly bent upper and lower edge portions 14 of a sheet metal plate 15. The plate 15 is secured on the open front of a sheet metal box 16 by screws 17 which pass through the edge portions 14 of plate 15 and are threaded into facing strips 18 of the box 16. The screws 17 pass through the grooves 13 beyond the top and bottom edges of the license plate 10, and when drawn up clamp the license plate 10 between the plate 15 and its bent over edge portions 14.

To remove the license plate 10 all that is required is to loosen the screws 17 to relax the grip of the turned over ends 14 of plate 15. The plate then can be slid free of the grooves 13.

In order to illuminate the license plate 10, the plate 15 is provided with an opening 20, see Figs. 2 and 4, which extends beyond the area of plate 10 on which the letters and numerals 11 are mounted. The illumination is provided by a trio of electric lamps 21 mounted in sockets 22 secured to the rear wall of box 16. Electrical wires 23 extend from the sockets 22 through a perforation 24 in the bottom wall of box 16 to a suitable source of power.

It will be seen, therefore, that the lamps 21 will illuminate the plate 10 and distinctly outline the letters and numerals 11.

In order to mount the box 16 on the bracket provided on modern automobiles, a pair of arms 25 are secured to the rear wall thereof and extend below the box. At its lower end each arm 25 is provided with a slot 26 by which the box is mounted on the said bracket in familiar fashion.

It will be seen that the device of the invention is of simple and economical construction, is readily secured in place and repaired while in place, and is effective in operation.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Mounting means for a license plate including an interiorly illuminated shallow rectangular box having an open side, comprising a plate positioned against the open side of the box and having its upper and lower edge portions bent forward and inward to form grooves, a large opening in said plate within the confines of the open side of the box, a translucent license plate having its top and bottom edges in said grooves, and screws passing through said forwardly and inwardly bent edge portions, said first plate and threaded into the material of the box defining its open side.

2. Mounting means for a license plate including an interiorly illuminated shallow rectangular box having an open side, comprising a plate positioned against the open side of the box and having its upper and lower edge portions bent forward and inward to form grooves, a large opening in said plate within the confines of the open side of the box, a translucent license plate having its top and bottom edges in said grooves, and screws passing through said forwardly and inwardly bent edge portions, said first plate and threaded into the material of the box defining its open side, said screws securing said first plate to the box and clamping the top and bottom edges of said license plate in said grooves.

ANTONIO VALENTE.

REFERENCES CITED

The following references are of record in the file of this patent:

UNITED STATES PATENTS

| Number | Name | Date |
|---|---|---|
| 1,792,635 | Gropper | Feb. 17, 1931 |
| 1,808,456 | Dwyer | June 2, 1931 |
| 2,388,221 | Smith | Oct. 30, 1945 |
| 2,451,775 | Raher | Oct. 19, 1948 |